March 12, 1963 C. KAPLAN 3,081,124
DEVICE FOR THE HANDLING OF ALIGNED OBJECTS
Filed April 29, 1960 3 Sheets-Sheet 1
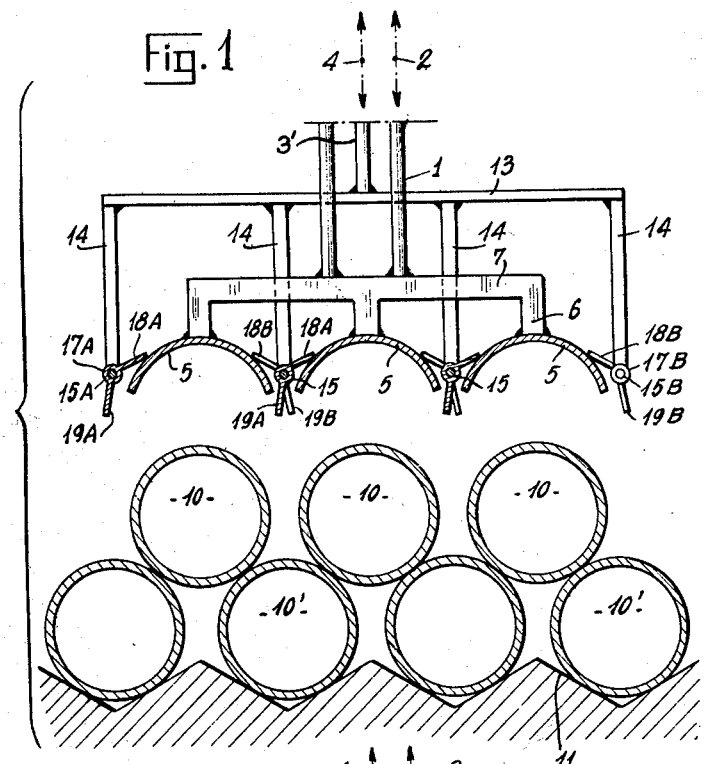
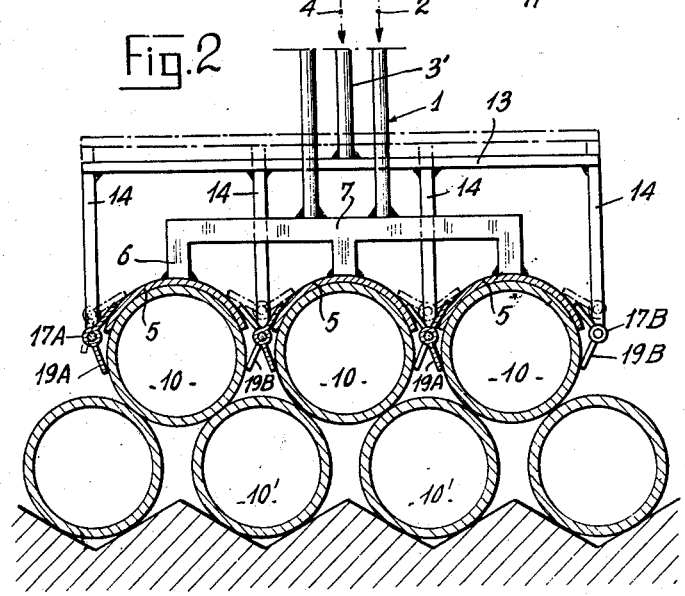
INVENTOR
CLAUDE KAPLAN
BY Irwin J. Thompson
ATTORNEY

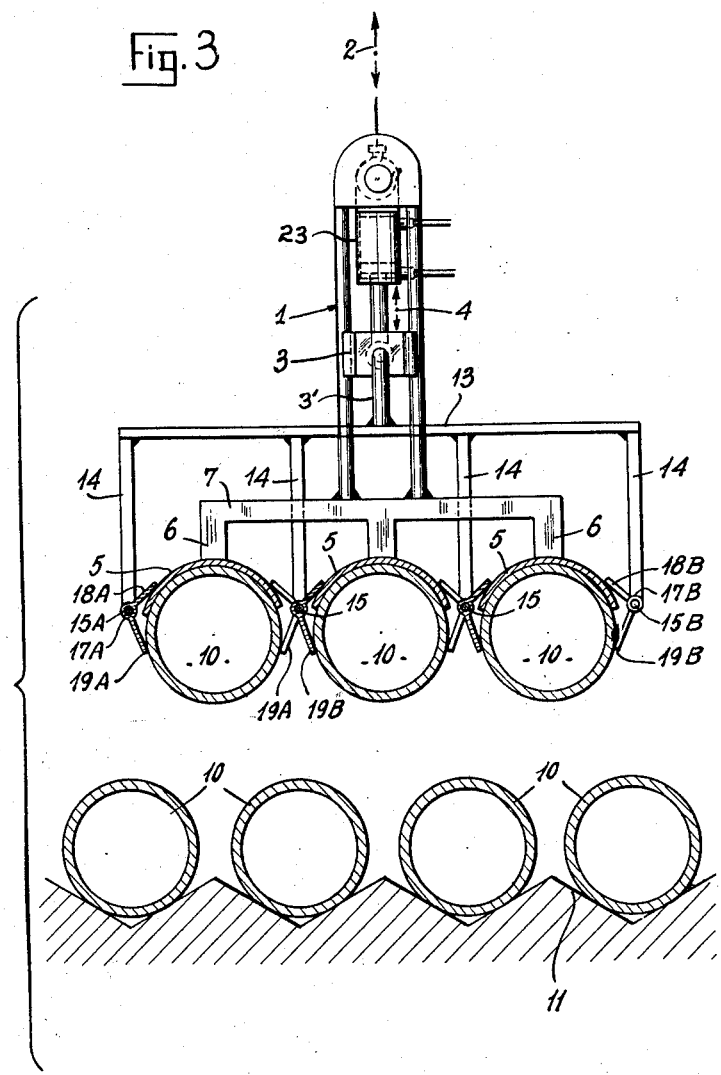

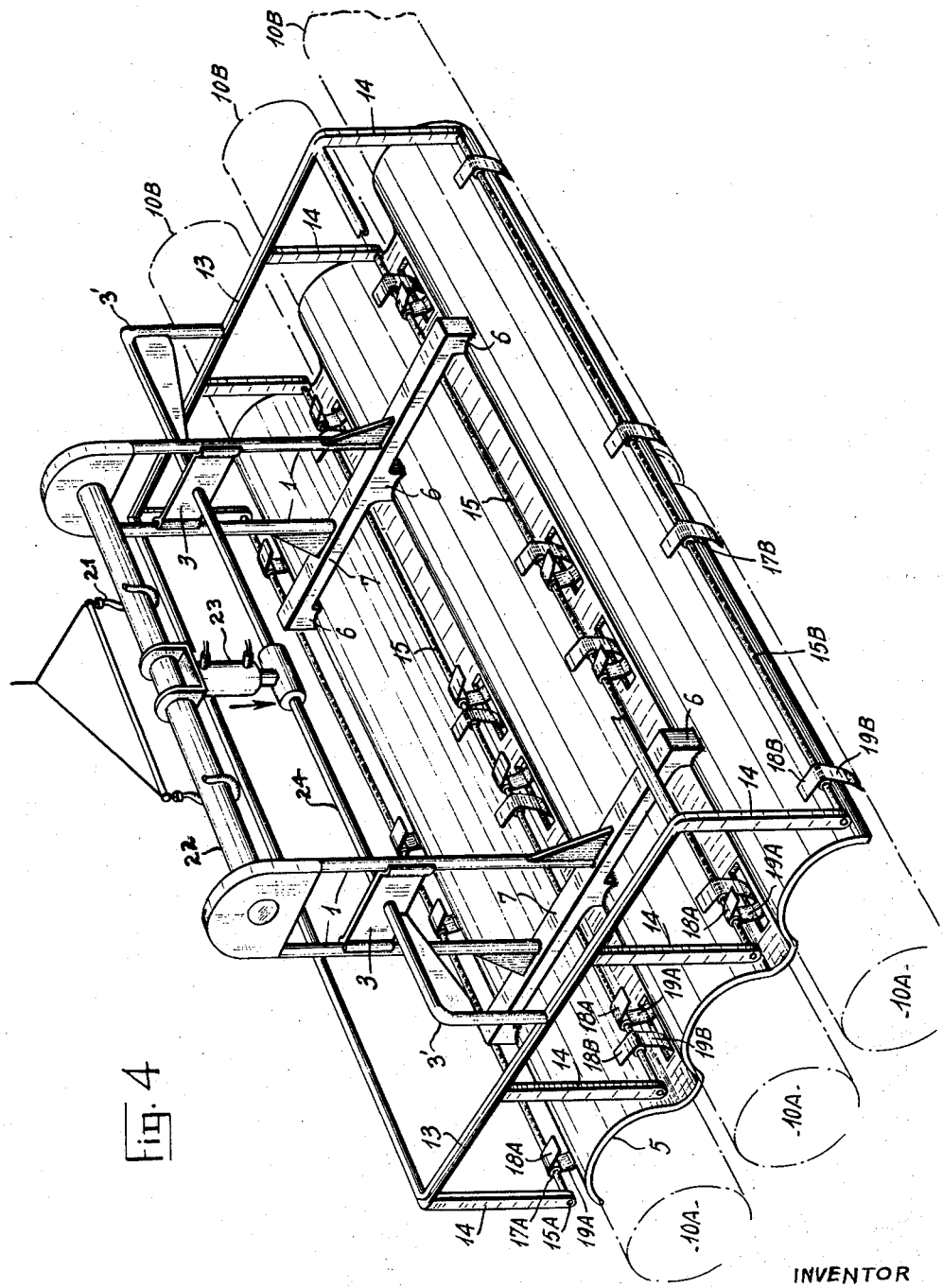

United States Patent Office 3,081,124
Patented Mar. 12, 1963

3,081,124
DEVICE FOR THE HANDLING OF ALIGNED OBJECTS
Claude Kaplan, Poissy, France, assignor to Electricite de France (Service National), Paris, France, a corporation of France
Filed Apr. 29, 1960, Ser. No. 25,653
Claims priority, application France July 16, 1959
8 Claims. (Cl. 294—87)

The present invention relates to a device for the handling of aligned objects, and more particularly cylindrical objects disposed in parallel rows or layers superimposed in staggered fashion, a certain spacing being provided between each pair of adjacent objects in each layer or row.

The invention has for its object to provide a device which permits of the seizing simultaneously of a certain number of objects in a layer or row, of the removal thereof and finally of the simultaneous depositing of the objects in a row similar to that from which they have been taken.

Such a device may serve, for example, for the handling of dangerous materials, in particular of a radio-active nature, in cartridges, tins of preserves, bottles, and more generally cylindrical or prismatic objects.

A device according to the invention comprises essentially, in combination with a handling apparatus of the usual kind, a centering assembly comprising a row of aligned cover members rigid with a bar effecting coupling with the said apparatus, and a gripping assembly adapted to slide along or in relation to the said bar under the effect of a positively controlled operating element, this gripping assembly comprising a frame carrying a row of pivots adapted to be displaced in the center plane or on either side of the said cover members and carrying, in association with each of these members, at least one movable portion freely rotatable about a pivot adjacent to this member, having a bearing arm adapted to engage against the edge of the member and a gripping arm adapted to engage against an object and press it against the said member.

In a device thus formed a simple relative movement of the gripping assembly with respect to the centering assembly permits at will, and simultaneously, either of release of the movable gripping portions for engagement or release of the device in relation to a row of objects, or of the rendering of the said portions active with a gripping of each object against a corresponding cover member by a simple rocking of the bearing arms against an adjacent edge of the associated member.

A device according to the invention will be described by way of example with reference to the accompanying drawings, in which FIG. 1 is a diagrammatical view in elevation of a device arranged for the handling of cylindrical objects disposed in horizontal layers, the device being in the position of rest.

FIG. 2 is a similar view showing the engagement of the device with a layer of objects.

FIG. 3 is a similar view showing the device carrying a layer of objects.

FIG. 4 is a perspective view of the device.

The device is associated with a handling apparatus of the usual kind (not shown), such as a travelling crane, a gantry, hoist or the like. It comprises an assembly termed a centering assembly connected to bars 1, which are carried and operated by the handling apparatus, and an assembly termed the gripping assembly connected to members 3 adapted to slide along the bars 1. The means for actuating the bars 1 on the one hand and the members 3 on the other hand are for example hook members 21 of one of the aforementioned handling apparatus engaging a rod 22 disposed between bars 1 (FIG. 4) and a hydraulic device 23 (FIGS. 3 and 4) engaging rod 22 and another rod 24 disposed between members 3. The actuating means operate in the directions indicated diagrammatically by arrows at 2 and 4.

The centering assembly comprises a series or row of cover members 5, for example of sheet metal or in sectional form having a configuration conforming substantially to the shape of the objects 10 to be handled, connected by means of arms 6 to a transverse member 7 rigid with the bars 1. Each of these members, which are three in number in the example selected, is adapted to encase the upper face of one of the objects 10 of cylindrical form, these objects being disposed in the form of a horizontal layer. This layer is superimposed in staggered fashion over a first layer of identical objects 10' which are themselves located on a support 11 adapted to maintain them at a predetermined distance between centers which is greater than their diameter. The objects in the layer 10 are accordingly also spaced from one another and it is possible to have a stack comprising a desired number of such layers. Furthermore, it is obvious that the bars 1 may also be secured so as to correctly locate the centering assembly above the object support.

The gripping assembly comprises a frame 13 rigid with rods 3' the sliding members 3 and, proceeding from this frame, a series of arms 14, each of these arms comprising a pivot 15 or a plurality of pivots 15 then aligned in a plane perpendicular to the plane of the drawing. As shown by the drawing, a pivot 15 of this nature is disposed in the center plane of each pair of adjacent cover members 5, and two pivots 15A, 15B are located respectively on either side of the outer cover members. The left hand pivot 15A carries, freely rotatable, a certain number of movable portions 17A having two arms 18A and 19A forming an angle which, to permit of better application of the invention, should be greater than 60°, the arm 18A directed towards the right coming to bear against the adjacent edge of the cover member to the left. In similar fashion the right hand pivot 15B carries a certain number of movable portions 17B having a bearing arm 18B and a downwardly extending gripping arm 19B, similar to the portions 17A, the bearing or lateral arm 18B, however, being towards the left to bear against the adjacent external cover member. The inner pivots 15, which are each located in a center plane of two adjacent cover members, carry movable portions of the two kinds "left" 17A and "right" 17B disposed alternately.

During the introduction of the device (FIG. 1) the members 3 carrying the gripping assembly occupies the upper position along the bars 1 carrying the centering assembly, and the downwardly directed arms 19A, 19B are located between or to the side of the edges of the adjacent cover members 5. It is also possible in a modification of FIG. 1 in order to release to a maximum extent the lower part of the device when covering cylinders to mount the pivots 15 still higher, the parts 18 then no longer being in contact themselves with the members 5. With the same object in view the right and left hand ends of the members 5 may with preference be disposed vertically. With the aid of the handling apparatus the device is displaced for the purpose of moving the cover members 5 approximately plumb with the layer of objects 10 to be removed. The assembly of the device is then lowered (FIG. 2) until the cover members 5 fit over the objects 10, or into the immediate proximity thereof (fragile objects), and then, with the help of the means 23 the members 3 and rod 24 are moved into a lower position along the bars 1. This being done the movable portions 17, actuated by their pivots 15, accomplish a downward and rotary movement, their lateral arms 18 coming to bear against the associated edge of the cover member, causing them to rock, the portions of the "left" hand type 17A anticlockwise and the portions of the "right" hand type 17B in the opposite direction. This rotation continues until the moment when the downwardly moving arms 19A, 19B move into contact with the corresponding object 10 and when there is brought about a buttressing effect, and each object 10 is gripped between a cover member 5 and a series of arms 19A on the left hand side and a series of arms 19B on the right hand side.

The gripping assembly being held by the means 23 in its lower position along the bars 1 the device thus loaded, operated by the means 21, may be moved away proceeding from the handling apparatus (FIG. 3). Once it has arrived plumb with the position selected for depositing the objects the device is lowered until the row of loaded objects 10 is presented at a height which is slightly greater than that which the said objects are required to occupy. The gripping assembly is raised by action anew on the means 23 into its upper position along the bars 1. The movable portions 17, actuated by their pivots 15, are thus returned into their initial position and the objects are released either on to a support such as 11 or on to a layer of objects 10' already deposited.

The arrangement which has just been described is capable of a large number of modifications.

In the first place it will be obvious that the number of cover members or centering means and of corresponding movable gripping portions may be as desired with a view to the simultaneous manipulation of a corresponding number or of a smaller number of objects.

In place of a cylindrical object a line of such objects placed end to end or separated from one another by a desired spacing may be acted upon by the same cover member and associated lines of gripping portions, on the condition that the length of the said member is sufficient, this also applying to the length of the pivots 15 and the number of associated gripping portions.

The supporting arms 14 for the pivots 15 may be articulated on their frame to the support 13 with a view to taking up a possible decentering which may take place between the two assemblies.

According to the profiles of the objects and of the cover members, which may be variable, it is possible to consider the possibility of providing only one single movable gripping portion in respect of each cover member, which simplifies the device. The form of the movable portions is also variable. The profile of their downwardly extending gripping arms proper may be curved or bent, for example, for the purpose of better adaptation to the surface of the cylindrical or other shaped objects.

The objects to be manipulated may not be horizontal, but inclined, or even vertical, in which case it will be sufficient if necessary to incline the entire device up to the horizontal, the accompanying drawings then becoming plan views in place of elevational views. In such applications the gripping portions may with advantage be furnished with teeth to improve their gripping action.

I claim:

1. A device for the handling of aligned objects especially cylindrical parallel objects disposed in superimposed layers, comprising a handling apparatus, a centering assembly forming a row of aligned cover members, bar means effecting coupling with said apparatus, said bar means being rigidly connected to said centering assembly, a gripping assembly adapted to be slidably movable in parallel relation to and along said bar means, means operatively connected to said gripping assembly to slidably move said gripping assembly along said bar means, said gripping assembly including a frame, a row of aligned pivots carried by said frame to be displaced thereby on either side and between said cover members towards the objects to be handled when said row of cover members is placed upon a row of objects by movement of said gripping assembly along said bar means, at least one movable portion in association with and freely rotatable about each said pivot, each said movable portion having a bearing arm adapted to engage against the top surface of an adjacent cover member and a gripping arm adapted to engage against an object and press it against said cover member when said gripping assembly is moved into operating and handling position.

2. A device according to claim 1, in which said row of pivots comprises one pivot between each pair of adjacent cover members and at least one of said movable portions is provided thereon for each adjacent cover member.

3. A device according to claim 1 in which each said pivot situated between two adjacent cover members carries a plurality of movable portions disposed end to end, certain of these movable portions co-operating with one of the adjacent cover members whilst the remaining movable portions, alternating with the preceding ones, co-operate with the other adjacent cover member.

4. A device according to claim 1 in which arms are articulated to said frame of said gripping assembly and carry said pivots thereon.

5. A device according to claim 1 in which the device includes means to manipulate objects constituted by at least two elementary objects disposed end to end.

6. A device according to claim 1, in which the cover members are constituted by members formed of curved sheet metal.

7. A device according to claim 1, in which the cover members are constituted by members composed of material having a configuration conforming substantially to the shape of the objects to be handled.

8. A device according to claim 1 in which the movable portion is centrally pivoted and said gripping arm is angularly bent with respect to said bearing arm.

References Cited in the file of this patent

UNITED STATES PATENTS

| 1,221,765 | Penfield | Apr. 3, 1917 |
| 1,736,367 | Reeder | Nov. 19, 1929 |
| 2,902,311 | Reel | Sept. 1, 1959 |